United States Patent [19]
Munter

[11] 4,450,557
[45] May 22, 1984

[54] SWITCHING NETWORK FOR USE IN A TIME DIVISION MULTIPLEX SYSTEM

[75] Inventor: Ernst A. Munter, Kanata, Canada

[73] Assignee: Northern Telecom Limited, Montreal, Canada

[21] Appl. No.: 319,198

[22] Filed: Nov. 9, 1981

[51] Int. Cl.³ .............................................. H04J 3/08
[52] U.S. Cl. ......................................... 370/58; 370/64
[58] Field of Search ....................... 179/18 R, 18 EB; 370/58, 63, 64, 66, 68

[56] References Cited

U.S. PATENT DOCUMENTS

| | | |
|---|---|---|
| 3,851,105 | 11/1974 | Regnier . |
| 3,959,596 | 5/1976 | Bojanek et al. ........................ 179/15 |
| 4,032,719 | 6/1977 | Blasbalg ................................. 179/15 |
| 4,123,624 | 10/1978 | Gagnier et al. . |
| 4,320,501 | 3/1982 | Dieu et al. ............................ 370/64 |

FOREIGN PATENT DOCUMENTS

| | | |
|---|---|---|
| 2026295 | 1/1980 | European Pat. Off. . |
| 39948 | 11/1981 | European Pat. Off. . |
| 62295 | 10/1982 | European Pat. Off. . |
| 2339309 | 8/1977 | France . |
| 2339310 | 8/1977 | France . |
| 2462835 | 2/1981 | France . |
| 2026285 | 1/1980 | United Kingdom . |

OTHER PUBLICATIONS

IEEE National Telecommunications Conference "Two-Stage Time Division Switching Systems"-Author: Robert G. Field.
1978 International Zurich Seminar on Digital Communications, "Digital Transmission and Switching in Local Networks-Author, H. G. Alles.

Primary Examiner—Benedict V. Safourek
Attorney, Agent, or Firm—Robert C. Hogeboom

[57] ABSTRACT

A non-blocking switching network for use in a TDM (time division multiplex) system for switching digital signals carried on incoming buses to outgoing buses (e.g. in a telephone switching office) is disclosed. In one embodiment the digital signals, on each pair of incoming buses, are alternately stored in two memory devices. During "even" frames the digital signals from a first incoming bus of the pair are stored in a first memory device and during "odd" frames the digital signals from the first incoming bus of the pair are stored in a second memory device. Similarly, during the "even" frames the digital signals from the second incoming bus of the pair are stored in the second memory device and during the "odd" frames the digital signals from the second incoming bus of the pair are stored in the first memory device. Also, during "even" frames the first outgoing bus is responsive to signals stored in the first memory device and during "odd" frames is responsive to the signals stored in the second memory device. Similarly, during "even" frames the second outgoing bus is responsive to signals stored in the second memory device and during "odd" frames is responsive to the signals stored in the first memory device.

31 Claims, 5 Drawing Figures

SWITCHING NETWORK FOR USE IN A TIME DIVISION MULTIPLEX SYSTEM

FIELD OF THE INVENTION

The present invention relates generally to telecommunication switching systems or the like and more particularly to a switching network for use with PCM (pulse code modulation) signals in a TDM (time division multiplex) environment.

BACKGROUND OF THE INVENTION

A switching system is provided in conventional telephone systems for interconnecting transmission paths between subscribers. In the contemporary systems employing PCM and TDM techniques, the switching systems are commonly based upon either a space-time-space configuration or upon a time-space-time configuration. U.S. Pat. No. 4,123,624 dated Oct. 31, 1978 by R. Gagnier et al and U.S. Pat. No. 3,851,105 dated Nov. 26, 1974 to A. Regnier et al depict examples of time-space-time switching systems.

In a time-space-time switching system, switching is accomplished by first switching a given channel in time, then switching it in space, and finally, once again switching it in time; hence the name time-space-time representing a time-switch, a space-switch, and a time-switch. In essence, a time-space-time switch functions to switch a channel from one assigned timeslot in an incoming bus to one assigned timeslot in an outgoing bus. This concept is well known in the art of switching. A space-time-space switch is similar in operation to the time-space-time switch except of course for the fact that it has two stages of space switching and only one stage of time switching.

Another concept to be considered in a switching system is network blocking. Network blocking refers to the inability of a switching system to provide a connection between two idle end-points. In other words, two subscribers cannot be connected together by the switching system because all available paths through the network (of the switching system) are in use. Present multistage switching networks (e.g. time-space-time switches) exhibit some degree of blocking. A single stage timeswitch is inherently non-blocking, but the number of channels that can be served a single timeswitch is limited by the speed of the memory devices employed. One object of the present invention is to provide a method and a circuit by which a relatively large (e.g. 2048 channels) non-blocking switching network may be constructed. Note, that for the purposes of this description, a switching network is considered to be comprised of a switching module (which performs the actual switching chores) and a control module to control the operation of the switching module.

SUMMARY OF THE INVENTION

In one embodiment of the present invention, incoming channels on two incoming buses (each having 512 channels) are switched to outgoing channels on two outgoing buses (each having 512 channels). Two storage devices, each having a capacity of 1024 words of ten bits each, are employed. For a first frame, the data from a first incoming bus is applied to a first storage device and the data from a second incoming bus is applied to a second storage device. Simultaneously, during this first frame, a first outgoing bus is receiving data from the first storage device and a second outgoing bus is receiving data from the second storage device.

During the next (i.e. second) frame the buses are switched so that the data from the first incoming bus is applied to the second storage device and the data from the second incoming bus is applied to the first storage device. Simultaneously, during this second frame, the first outgoing bus is receiving data from the second storage device and the second outgoing bus is receiving data from the first storage device.

During the next (i.e. third) frame the buses are switched back to their original connections (i.e. as for the first frame). For the fourth frame the buses are switched to the connections described for the second frame, and etc., for subsequent frames.

The switching network of the present invention has certain characteristics of both a time-switch and of a space-switch. Since it switches the channels in time it clearly has the elements of a time-switch. Because of this time-switching function of the present invention, it can find application, for example, as the time switches 0 to 7 depicted in FIG. 2 of the aforementioned U.S. Pat. No. 4,123,624. Additionally, since the switching network also switches in space, it can be considered as performing the function of a time-space-time switch or alternately of a space-time-space switch. Because of this broad nature of the switching network of the present invention, it will be referred to solely as a switching network.

Stated in a different manner, the present invention is a switching network for use in a TDM (time division multiplex) system for switching digital signals carried in timeslots on N incoming buses to timeslots on M outgoing buses, wherein N and M are positive integers, $N \geq 2$, and $M \geq 2$, the network comprising: a plurality of storage means, the plurality of storage means being divided into N first groupings of N/n storage means each, each first grouping sequentially and cyclically being responsive to n incoming buses, one incoming bus at a time, wherein n is a positive integer, n is a factor of N, and $2 \leq n \leq N$; and each group of n outgoing buses selectively responsive to one of M/n second groupings of the storage means, each second grouping comprising N storage means comprising no more than one storage means from each of the first groupings.

Stated in other terms, the present invention is a switching network for use in a TDM (time division multiplex) system for switching digital signals carried in timeslots on P pairs of incoming buses to timeslots on P pairs of outgoing buses, wherein P is a positive integer, $P \geq 1$, the network comprising: P pairs of memory means, each pair of memory means responsive to a pair of incoming buses, in a one to one relationship, each memory means comprising P storage means; and each pair of outgoing buses being responsive to a distinct group of 2P storage means, each group of storage means comprising one storage means from each of the memory means.

Stated in yet other terms, the present invention is a method for use in a TDM (time division multiplex) system for switching digital signals carried in timeslots on N incoming buses to timeslots on M outgoing buses, wherein N and M are positive integers, $N \geq 2$, and $M \geq 2$, the method comprising: sequentially and cyclically storing the data from each incoming bus, of each group of n incoming buses, in n first storage groups, each of N/n storage means, wherein n is a positive integer, $2 \leq n \leq N$, and n is a factor of N; sequentially and cyclically connecting each outgoing bus, of each group of n outgoing buses, to n second storage groups, each of N/n storage means, wherein each second storage group results from a re-organization of the first storage groups and comprises no more than one storage means from each of the first storage groups, wherein each second storage group comprises storage means responsive to different groups of n incoming buses, and wherein each outgoing bus has access to at least one storage means from each of the first groups.

BRIEF DESCRIPTION OF THE DRAWINGS

The invention will now be described in more detail with reference to the accompanying drawings, wherein like parts in each of the several figures are identified by the same reference character, and wherein.

DETAILED DESCRIPTION

Figure 1:
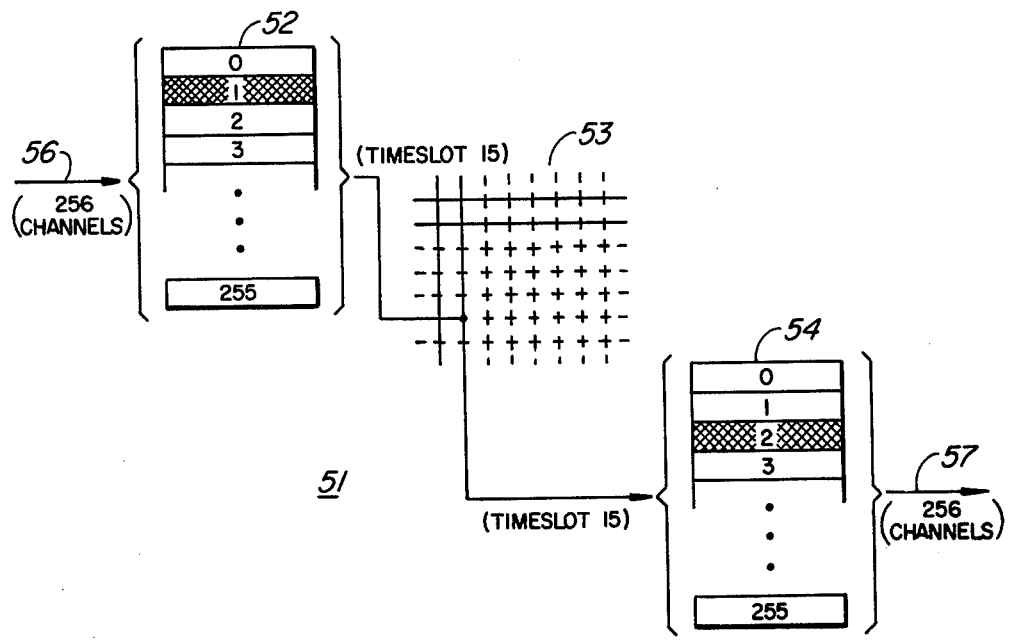
FIG. 1 is a simplified representation of a prior art time-space-time switching network.

FIG. 1 is a simplified symbolic representation of a time-space-time switching network 51 (also referred to as a three stage switching network). Network 51 comprises a time switch 52, a space switch 53, and a time switch 54, interconnected as depicted in FIG. 1. As this concept is well known it will be described here only briefly. A single bus 56 having 256 channels is depicted entering time switch 52. Assume that the channel under consideration on bus 56 is assigned to time slot 1 as depicted by the shaded area in time switch 52.

Time switch 52 serves to switch channels between time slots, and in the example illustrated in FIG. 1, has switched the channel of interest from incoming time slot 1 to internal time slot 15 of space switch 53. When incoming time slot 1 arrives, the information contained therein is stored until the internal time slot 15 arrives; thus we have time switching. When internal timeslot 15 arrives it carries the information through an assigned crosspoint in space switch 53. This assigned crosspoint interconnects an incoming TDM bus 56 with an outgoing TDM bus 57 (note that in this simplified example there is depicted only one incoming TDM bus, i.e. 56, and there is depicted only one outgoing TDM bus, i.e. 57). Thus we have switched in space. Note that the crosspoint (in switch 53) is assigned only for the duration of the sample (i.e. for one timeslot), and for the other 255 time slots of the frame, switch 53 can be assigned other crosspoints.

The information is output from space switch 53 is timeslot 15, the same time slot on which it was entered. The information is then applied (still on timeslot 15) to space switch 54 where it is stored until time slot 2 arrives to carry the signal further. Thus we have once more switched in time. This sequence of time-space-time switching is repeated once each frame for our signal on incoming timeslot 1 (note: one frame contains 256 timeslots in this example).

Figure 2:
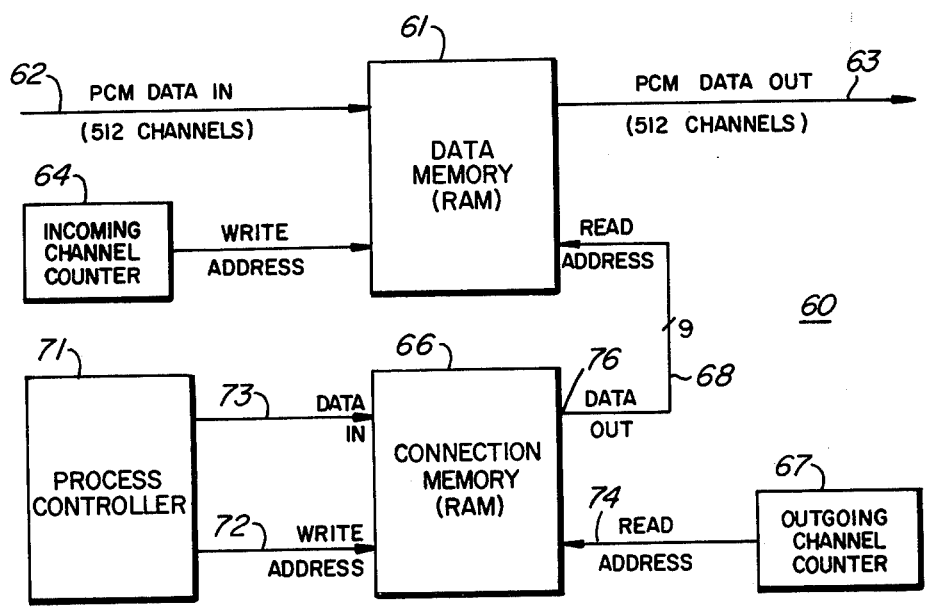
FIG. 2 is a simplified block diagram depicting a prior art "simple" time switch.

FIG. 2 is a simplified block diagram of a typical time switch 60. The incoming channels (512 in number) are applied to data memory 61 via TDM bus 62. In the illustrative embodiment of FIG. 2, bus 62 carries each PCM sample (from the 512 channels) in parallel, in a sequential fashion, at the rate of one PCM sample approximately every 200 nanoseconds (note: the actual duration needed for writing is 100 nanoseconds). In such an embodiment, data memory 61 comprises three RAMs (random access memory) such as Intel's model no. 2148, capable of storing 512 binary words, each word having up to ten bits. The outgoing channels are read from data memory 61 and are applied to outgoing TDM bus 63, in parallel, at the rate of one PCM sample approximately every 200 nanoseconds.

In simplistic terms, incoming channel counter 64 basically keeps track of which channels are being received at any given instant and produces an address appropriate for each channel, such that when a given channel is received by data memory 61 it is stored in memory 61 at the address given by counter 64. Note that data memory 61 has 512 memory locations, one for each channel. The incoming PCM data on TDM bus 62 are written sequentially into storage locations in data memory 61 under control of incoming channel counter 64. In other words, a specific PCM sample is stored in data memory 61 at an address corresponding to the incoming channel number as designated by counter 64. Note that counter 64 is simply a sequential counter, counting in increasing order from 0 to 511 in step with the incoming channels, and then repeating its count over and over again.

Connection memory 66 (e.g. Intel RAMs, model no. 2148) contains a set of incoming channel addresses. The function of memory 66 is to send a read address (via bus 68) to data memory 61, at the appropriate time, (determined by outgoing channel counter 67) to cause a PCM sample stored in data memory 61 to be read out on bus 63. Connection memory 66 achieves this as follows.

As an example, assume that channel 400 on incoming bus 62 is to be connected to channel 501 on outgoing bus 63. Process controller 71 produces the address for channel 501 on address bus 72 and simultaneously provides on data bus 73 the address for channel 400, to be stored as data in memory 66 at the location specified by address bus 72. Subsequently, when the read address corresponding to channel 501 is applied to connection memory 66, from outgoing channel counter 67, via read address bus 74, the data output on data output 76 (applied to the read address bus 68 of data memory 61) is in fact the address for data memory 61 corresponding to the location wherein channel 400 from input bus 62 has been stored. Thus, in simplistic terms, counter 67 addresses connection memory 66 with the address for channel 501, connection memory 66 produces the address of channel 400 on data output 76 and in turn applies it to the read address input for data memory 61 and the PCM word from channel 400, stored in memory 61 is applied to TDM bus 63 during channel 501. In summary, for any outgoing channel, any incoming PCM sample can be selected by appropriately loading connection memory 66 from processor 71.

Figure 3:
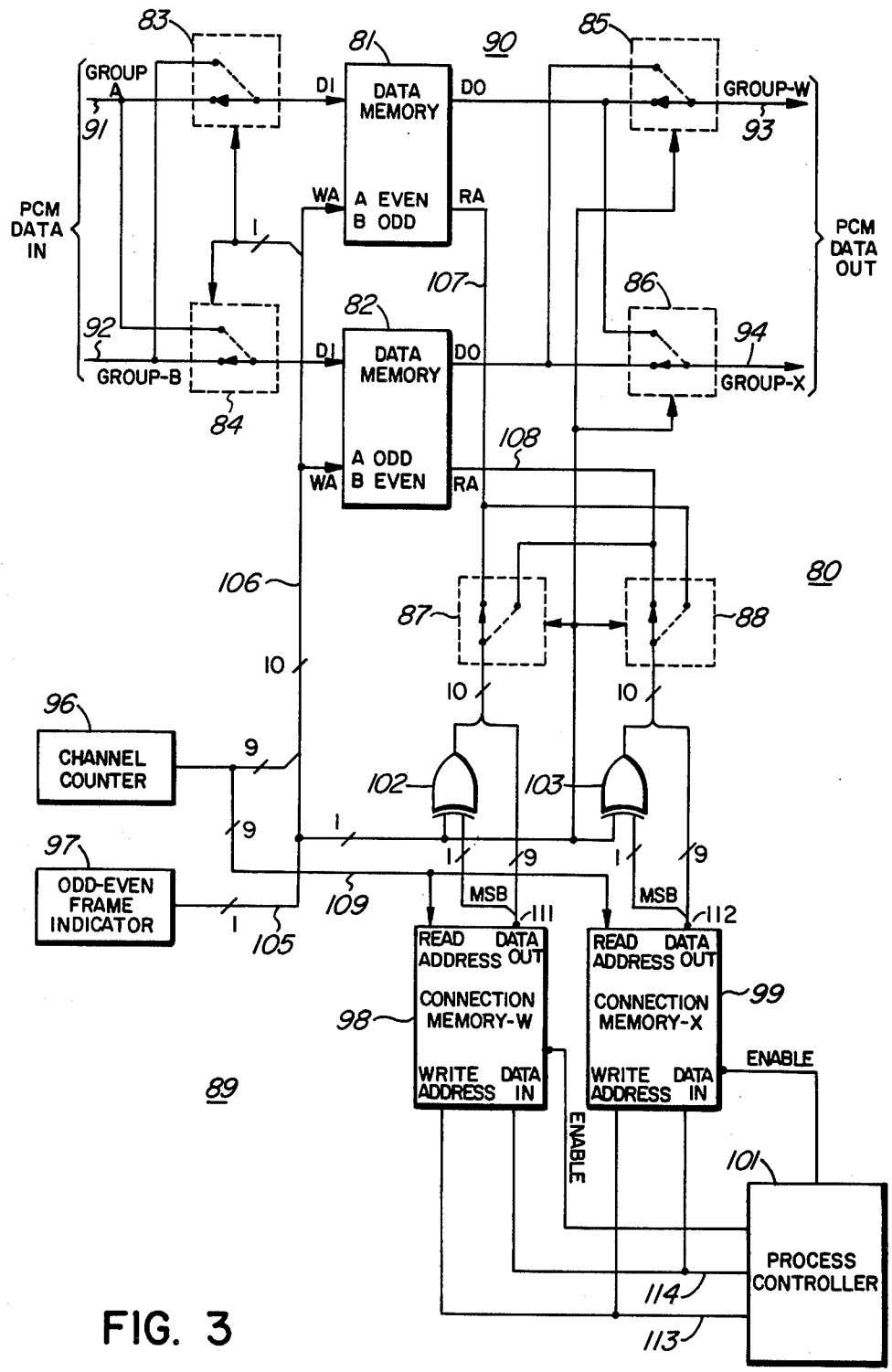
FIG. 3 is a simplified block diagram depicting the preferred embodiment of the present invention for switching 1024 channels.

FIG. 3 depicts one preferred embodiment of the present invention; i.e. switching network 80 comprised of switching module 90 and control module 89. The components thereof are interconnected as depicted in FIG. 3 and attention is directed thereto.

Incoming bus 91 carries 512 channels sequentially, in parallel, and applies them to either data memory 81 or data memory 82, depending upon the status of switches 83 and 84. Likewise, incoming bus 92 carries 512 channels sequentially, in parallel, and applies them to either data memory 81 or data memory 82, depending upon the status of switches 83 and 84. As an aid to describing the operation of the invention, the channels on bus 91 will be referred to as "Group-A" channels and those on bus 92 will be referred to as "Group-B" channels. Similarly, the channels on bus 93 will be referred to as "Group-W" channels and those on bus 94 as "Group-X" channels.

Switches 83 and 84 are depicted as simple mechanical single pole double throw (SPDT) switches in order not to unnecessarily complicate the description. In actual practice, switches 83 and 84 are preferably static solid-state switches (e.g. model no. 74S257). Note that data memory 81 (e.g. three Intel model no. 2148) can store 1024 binary words of ten bits each; memory 82 has the same capacity as memory 81.

Similarly, switches 85 and 86 function to connect the outputs of data memories 81 and 82 to outgoing buses 93 and 94. Switches 85 and 86 (along with switches 87 and 88, yet to the discussed) are also preferably static solid-state switches (e.g. model no. 74S257). The object of switching network 80 is to be able to switch any one of the 512 channels appearing either on bus 91 or 92 to any one of the 512 channels appearing either on bus 93 or 94. The principle behind how switching network 80 accomplishes this is as follows.

Note that each switch 83, 84, 85, 86, 87, and 88 has both a first position (indicated by a solid arrow) and a second position (indicated by a dashed line). Buses 91 and 92 have their respective frames in phase; i.e. when a new frame starts on bus 91 a new frame is also starting on bus 92. Similarly, buses 93 and 94 have their respective frames in phase with one another and also in phase with the frames appearing on buses 91 and 92. While in-phase operation of the switches is used in the preferred embodiment of the invention if necessary, or advantageous, it is of course possible to delay the outgoing bus frames with respect to the incoming buses. This could be accomplished by using separate counters (i.e. counter 96 would be replaced by two counters; one counter for memories 81 and 82 and one counter for connection memories 98 and 99) or by inserting a fixed delay on address bus 109. For the preferred embodiment of the present application a single counter 96 is used.

All the switches 83, 84, 85, 86, 87 and 88 are operated substantially in unison so that for a first frame the switches are all in their first position (indicated by the solid arrow) and for the next frame they are all in their second position (indicated by the dashed line) and for the next frame they are all in their first position, etc. In short, every alternate frame (hereinafter referred to as even frames for convenience) they are in their first position, and every inbetween frame (hereinafter referred to as odd frames, for convenience) they are in their second position. The control of switches 83 to 88 inclusive is accomplished by the one-bit from odd-even frame indicator 97 on lead 105.

PCM data received on bus 91 during an even frame is stored in data memory 81 (indicated in FIG. 3 as A even). PCM data received on bus 92 during an even frame is stored in data memory 82 (indicated in FIG. 3 as B even). During the odd frames, data from bus 91 is stored in data memory 82 (indicated as A odd) and data from bus 92 is stored in data memory 81 (indicated as B odd).

During even frames, PCM data on outgoing bus 93 is read from data memory 81. Recall that data memory 81 contains data originating from bus 91 in even frames and from bus 92 in odd frames (i.e. A even and B odd). Also during even frames, PCM data on outgoing bus 94 is read from data memory 82 containing data originating from bus 92 in even frames and from bus 91 in odd frames (i.e. A odd and B even).

During odd frames, switches 83, 84, 85, 86, 87 and 88 are in their second (dashed) position. PCM data on outgoing bus 93 is read from data memory 82 (i.e. A odd and B even). Also during odd frames, PCM data on outgoing bus 94 is read from data memory 81 containing data originating from bus 91 in even frames and from bus 92 in odd frames (i.e. A even and B odd).

As a result, bus 93 has acces to any of the input channels on buses 91 and 92. Similarly, bus 94 has access to any of the input channels on buses 91 and 92.

As an illustrative example, assume that a channel on bus 91 is to be connected to a channel on bus 93. In an even frame bus 93 is connected to data memory 81 via switch 85 to access data that was received from bus 91 during even frames (i.e. A even and thus the channel in question). In an odd frame bus 93 is connected to data memory 82, via switch 85, to access data that was received from bus 91 during odd frames (i.e. A odd and thus the channel in question).

Assume instead that a channel on bus 92 is to be connected to a channel on bus 93. In an even frame, bus 93 is connected to data memory 81, via switch 85, to access data that was received from bus 92 during the previous odd frame (i.e. B odd and thus the channel in question). In an odd frame, bus 93 is connected to data memory 82, via switch 85, to access data that was received from bus 92 during the previous even frame (i.e. B even and thus the channel in question). Consequently, bus 93 has access to any one of the 512 channels received on bus 91 and to any one of the 512 channels received on bus 92. Similarly, bus 94 has access to any one of the 512 channels received on bus 91 and to any one of the 512 channels received on bus 92.

The control module 89 of switching network 80 will now be described. It should be noted that the control module 89 of switching network 80 is not unlike the control portion of time switch 60 depicted in FIG. 2. Control module 89 of network 80, however, does have the addition of an odd-even frame indicator 97, exclusive-OR gates 102 and 103, switches 87 and 88, and two connection memories 98 and 99 in lieu of only one. Additionally, only a single channel counter 96 is used, to provide both write addresses to data memories 81 and 82, and read addresses to connection memories 98 and 99 (note: in FIG. 2, channel counter 64 and 67 could be replaced by a single counter for certain applications). Process controller 101 completes the major components of control module 89.

In operation, the output of channel counter 96, along with the output of odd-even frame indicator 97 (a one bit counter) provide a ten-bit write address, on address bus 106, for data memories 81 and 82. Counter 96 and indicator 97 are constructed from Texas Instruments model no. 74S163 counters. Each one of memories 81 and 82 is written seqentially as the data appears on its respective data input DI. The address at which the data is stored is of course defined by the binary address from both counter 96 and indicator 97 applied, via address bus 106, to the respective write address input WA. A specific PCM sample, from a given channel, is stored in either data memory 81 or 82 at an address corresponding to the incoming channel number (note that the most significant bit of the write address for memories 81 and 82 is the bit from indicator 97).

The data is output from data outputs DO of each memory 81 and 82 in response to a read address applied to the read address input RA of each memory 81 and 82. This read address is supplied by connection memories 98 and 99 on address buses 107 and 108 as depicted. In response to the address provided on read address bus 109, by channel counter 96, connection memory 98 produces on its data output terminals 111 a ten-bit address indicative of which channel on either bus 91 or 92 (as stored in data memories 81 and 82) is to be connected to the current channel on bus 93. In other words, the address on bus 107 (during an even frame) addresses a storage location in memory 81 containing data from a specific channel from either bus 91 or 92 which data is then read and applied to data output DO of memory 81 (during an even frame).

Similarly, during an even frame, connection memory 99 produces, on its data output terminals 112, a ten-bit address indicative of which channel on either bus 91 or 92 (as stored in data memory 82) is to be connected to the current channel on bus 94. In other words, the address on bus 108 (during an even frame) addresses a storage location in memory 82 containing data from a specific channel originating from either bus 91 or 92, which data is then read and applied to data output DO of memory 82.

It will be noted that the write addresses for both data memories 81 and 82 have as their most significant bit the output of odd-even frame indicator 97. Consequently, during even frames, the channels from bus 91 are stored in the one-half of data memory 81 with addresses beginning with logic 0 (i.e. the "lower" half). Likewise, during even frames, the channels from bus 92 are stored in the one-half of data memory 82 with addresses beginning with logic 0 (i.e. the "lower" half).

During odd frames, the output of indicator 97 is a logic 1, and consequently the addresses of all the channels received during odd frames begin with a logic 1. The channels from bus 91, during odd frames, are stored in the one-half of data memory 82 with addresses beginning with logic 1 (i.e. the "upper" half). Likewise, during odd frames, the channels from bus 92 are stored in the one-half of data memory 81 with addresses beginning with logic 1 (i.e. the "upper" half).

Exclusive-OR gates 102 and 103 are employed as controlled inverters. During even frames, the output of odd-even frame indicator 97 is a logic 0. Consequently, exclusive-OR gate 102 allows the logic bit applied to its other input (i.e. the most significant bit, MSB, from terminal 111) to be passed unchanged. It will be noted that the 512 binary words stored in connection memory 98 address only one-half of the locations in data memory 81 (i.e. there are 1024 locations in memory 81 but only 512 addresses stored in memory 98). More specifically, the data in connection memory 98 specify and select the sources (from any of the 1024 input channels on buses 91 and 92) for the 512 output channels appearing on bus 93.

During even frames, the most significant bit from data output terminal 111 is passed unchanged, and consequently the address applied to read address terminal RA on data memory 81 is the binary data as it appears on terminal 111. This in turn addresses data memory 81 to produce on its data output terminal DO the data stored from one of the channels on bus 91 or 92. This data is then applied to outgoing bus 93 via switch 85.

During odd frames, the most significant bit from data output terminal 111 is inverted by exclusive-OR gate 102 and consequently the address applied to read address terminal RA on data memory 82 (via switch 87) is not the binary data as it appears on terminal 111. Rather, the most significant bit is inverted; if the data in memory 98 addressed the "lower" half of data memory 81 during an even frame it will now address the "upper" half of data memory 82 during an odd frame. Similarly, if the data in memory 98 addressed the "upper" half of data memory 81 during an even frame it will now address the "lower" half of data memory 82 during an odd frame. This is necessary since the contents of a given channel on bus 91 are stored in the "lower" half of data memory 81 during even frames and in the "upper" half of data memory 82 during odd frames. Similarly, the contents of a given channel on bus 92 are stored in the "lower" half of data memory 82 during even frames and in the "upper" half of data memory 81 during odd frames.

Process controller 101 functions in an analogous manner to process controller 71 of FIG. 2. Write address bus 113, from processor 101, defines a location in connection memory 98 (or memory 99) corresponding to a channel on bus 93 (or bus 94). Processor 101, via data bus 114, stores in memory 98 (or memory 99), as data, the addresses of the channels (i.e. from buses 91 and 92) to be connected to bus 93 (or bus 94). These addresses are of course the addresses of locations in data memories 81 and 82 into which the data, carried by channels in buses 91 and 92, have been stored.

Consequently, outgoing bus 93 can convey data from up to 512 channels originating from the 1024 channels on both bus 91 and 92. Similarly, outgoing bus 94 can convey data from up to 512 channels originating from the 1024 channels on both bus 91 and 92.

Figure 4:
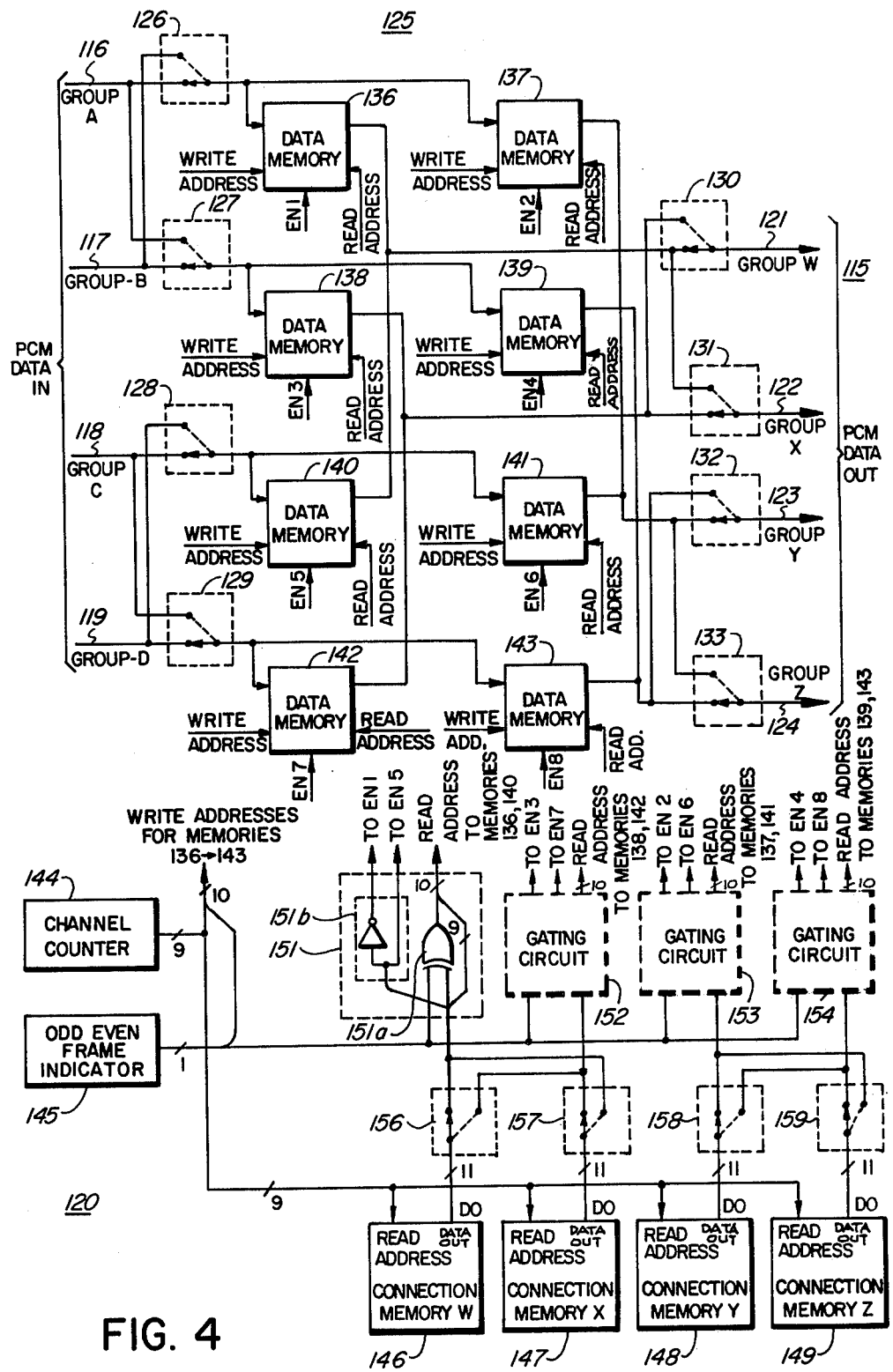
FIG. 4 is a simplified block diagram depicting the preferred embodiment of the present invention for switching 2048 channels.

FIG. 4 depicts another embodiment of the present invention (i.e. switching network 115 comprised of switching module 125 and control module 120) arranged to interconnect four incoming buses 116, 117, 118, and 119 (of 512 channels each) with four outgoing buses 121, 122, 123, and 124 (of 512 channels each). As the functioning of the FIG. 4 embodiment is similar to that of the FIG. 3 embodiment it will not be described in great detail.

Switch 126 applies the data from incoming bus 116 to both data memories 136 and 137 during even frames (indicated by the solid arrow in switch 126). During odd frames switch 126 applies the data from incoming bus 117 to both data memories 136 and 137 (indicated by the dashed connection in switch 126). Switch 127 applies the data from incoming bus 117 to both data memories 138 and 139 during even frames. During odd frames switch 127 applies data from incoming bus 116 to both data memories 138 and 139. Note that data memories 136, 137, 138, 139, 140, 141, 142, and 143 are constructed from Intel model 2148 CAM modules.

Similarly, switch 128 applies the data from incoming bus 118 to both data memories 140 and 141 during even frames. Switch 129 applies the data from incoming bus 119 to both data memories 142 and 143 during even frames. During odd frames, switch 129 applies the data from incoming bus 118 to both data memories 142 and 143 while switch 128 applies the data from incoming bus 119 to both memories 140 and 141.

Switch 130 connects outgoing bus 121 to both memories 136 and 140 during even frames and to both memories 138 and 142 during odd frames. Switch 131 connects outgoing bus 122 to both memories 138 and 142 during even frames and to both memories 136 and 140 during odd frames. Switch 132 connects outgoing bus 123 to both memories 137 and 141 during even frames and to both memories 139 and 143 during odd frames. Switch 133 connects outgoing bus 124 to both memories 139 and 143 during even frames and to both memories 137 and 141 during odd frames. As a result of these interconnections, any one of the 2,048 input channels of buses 116, 117, 118, or 119 of switching network 115 can be switched to any one of the 2,048 output channels of buses 121, 122, 123, or 124. Note that each switched connection takes an independent, time multiplexed path through switching network 115, thus ensuring non-blocking.

The control module 120 of switching network 115 is similar to that of the FIG. 3 control module 89 except that it is now expanded to have capacity to control the additional memories. Channel counter 144 is the same as counter 96 (FIG. 3) and odd-even frame indicator 145 is the same as indicator 97 (FIG. 3). There are now four connection memories 146, 147, 148 and 149, one for each of the outgoing buses 121, 122, 123, and 124, respectively. Each connection memory 146, 147, 148 and 149 has the capacity to store 512 binary words, each word having eleven bits. The data output from each memory 146, 147, 148, and 149 is applied to one of gating circuits 151, 152, 153, or 154, as controlled by switches 156, 157, 158, and 159, as depicted in FIG. 4.

As an illustrative example, during an even frame, connection memory 146 is connected to gating circuit 151 via switch 156. The nine least significant bits of the eleven bit binary word received from the data output DO of connection memory 146 are passed unchanged by gating circuit 151. The second most significant bit is applied to exclusive-OR gate 151a in a analogous manner as was the most significant bit in the FIG. 3 embodiment. The most significant bit is applied to decoder 151b (consisting of a single inverter). One output of decoder 151b is applied to the enable input EN1 of data memory 136 to selectively enable it for a read operation, and the other output of decoder 151b is applied to the enable input EN5 of data memory 140 to selectively enable it for a read operation. In short, decoder 151b functions to enable either data memory 136 or data memory 140 at one time (but not both simultaneously) for a read operation, the address of which is provided by the one bit from exclusive-OR gate 151a together with the nine bits obtained directly from connection memory 146 (during an even frame).

Similarly, gating circuit 152 provides enable signals (for inputs EN3 and EN7) and a ten bit read address to both data memories 138 and 142. Gating circuit 153 provides enable signals (for inputs EN2 and EN6) and a ten bit read address to both data memories 137 and 141. Gating circuit 154 provides enable signals (for inputs EN4 and EN8) and a ten bit read address to both data memories 139 and 143. Note that the write addresses for all the data memories 136 to 143 inclusive are provided by the ten bits provided by channel counter 144 and odd-even frame indicator 145. The process controller (not shown) for connection memories 146, 147, 148, and 149 is not depicted in the interest of not unduly complicating the description. It would work in an analogous manner to process controller 101 of FIG. 3.

Figure 5:
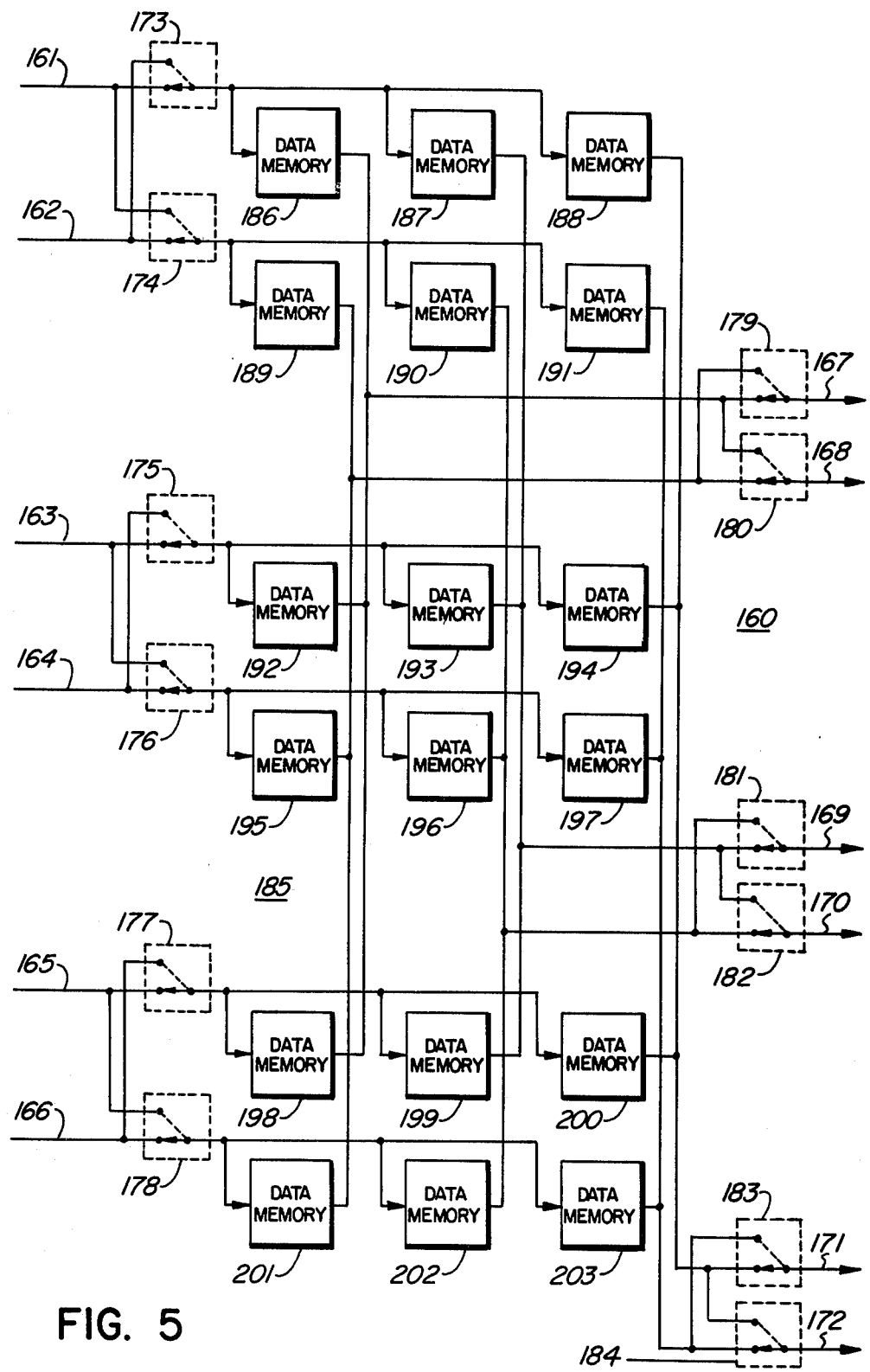
FIG. 5 is a simplified block diagram depicting the preferred embodiment of the present invention for switching 3072 channels.

FIG. 5 is a simplified block diagram of a further embodiment of the present invention (i.e switching network 160, of which only the switching module 185 is depicted), depicting the application of the present invention to six incoming buses 161 to 166 inclusive (512 channels each) and six outgoing buses 167 to 172 inclusive (512 channels each).

Eighteen data memories, 186 to 203 inclusive are employed. Data memories 186, 187, and 188 are responsive to data on incoming bus 161 during even frames and to data on incoming bus 162 during odd frames. Data memories 189, 190 and 191 are responsive to data on incoming bus 162 during even frames and to data on incoming bus 161 during odd frames.

Data memories 192, 193, and 194 are responsive to data on incoming bus 163 during even frames and to data on incoming bus 164 during odd frames. Data memories 195, 196, and 197 are responsive to data on incoming bus 164 during even frames and to data on incoming bus 163 during odd frames.

Data memories 198, 199, and 200 are responsive to data on incoming bus 165 during even frames and to data on incoming bus 166 during odd frames. Data memories 201, 202, and 203 are responsive to data on incoming bus 166 during even frames and to data on incoming bus 165 during odd frames. The control philosophy is the same as in FIGS. 3 and 4 and has not been shown in FIG. 5 in order to not unduly complicate the Figure. Switches 173 to 184 inclusive are identical to switches 126 to 133 inclusive of FIG. 4 and function in an analogous manner.

Other variations of the invention are also possible. One such variation is to multiplex the channels of Group-W and Group-X (in FIG. 4) onto a single bus having double the channel capacity of bus 121 (FIG. 4). Switches 130 and 131 (FIG. 4) would of course be eliminated. Another such variation is to multiplex the channels of Group-A and Group-B (in FIG. 4) onto a single bus having double the channel capacity of bus 116 (FIG. 4). Switches 126 and 127 (FIG. 4) would of course be eliminated. Both of the variations described above are intended to be included in the scope of the claims appended hereto.

What is claimed is:

1. A switching network for use in a TDM (time division multiplex) system for switching digital signals carried in timeslots on N incoming buses to timeslots on M outgoing buses, wherein N and M are positive integers, $N \geq 2$, and $M \geq 2$, said network comprising:

a plurality of storage means, said plurality of storage means being divided into N first groupings of N/n storage means each, each said first grouping sequentially and cyclically being responsive to n incoming buses, one said incoming bus at a time, wherein n is a positive integer, n is a factor of N, and $2 \leq n \leq N$; and said outgoing buses being divided into groups of n buses each, one bus of each outgoing group sequentially and cyclically being responsive to storage means in one of M/n second groupings of said storage means, N/n storage means at a time, wherein each said second grouping of said storage means comprises N storage means comprising no more than one storage means from each of said first groupings.

2. The switching network of claim 1 wherein n equals two.

3. The switching network of claim 1 wherein n equals three.

4. The switching network of claim 2 wherein N=M.

5. The switching network of claim 3 wherein N=M.

6. The switching network of claim 4 wherein N equals two, four, or six.

7. The switching network of claim 5 wherein N equals three, six, or nine.

8. A switching network for use in a TDM (time division multiplex) system for switching digital signals carried in timeslots on P pairs of incoming buses to timeslots on P pairs of outgoing buses, wherein P is a positive integer, $P \geq 1$, said network comprising:

P pairs of memory means, each said pair of memory means responsive to a pair of incoming buses, in a one to one relationship, each said memory means comprising P storage means; and each pair of outgoing buses being responsive to a distinct group of 2P storage means, each said group of storage means comprising one storage means from each of said memory means.

9. The switching network of claim 8 wherein each bus, of each pair of buses, is interchangeable, one with the other, at a predetermined constant rate.

10. The switching network of claim 9 wherein said constant rate is once per frame.

11. The switching network of claim 8, 9, or 10 wherein each said storage means has the capacity to store at least two full frames of data.

12. The switching network of claim 8 wherein each bus, of each pair of incoming buses, is interchangeable, one with the other, at a predetermined constant rate.

13. The switching network of claim 8 wherein each bus, of each pair of outgoing buses, is interchangeable, one with the other, at a predetermined constant rate.

14. The switching network of claim 12 or 13 wherein said constant rate is once per frame.

15. The switching network of claim 8, 12, or 13 wherein P equals two.

16. The switching network of claim 8 wherein each said group of 2P storage means is divided into two sections, each said section comprising storage means responsive to different pairs of incoming buses, and each outgoing bus, of each pair of outgoing buses, alternately being responsive to each said section of said group.

17. The switching network of claim 16 wherein P equals two and wherein each memory means, of each said pair of memory means, alternately being responsive to each incoming bus of said pair of incoming buses, at the same rate as said outgoing bus alternates between said sections.

18. The switching network of claim 16 or 17 wherein said rate is once per frame.

19. A switching network for use in a TDM (time division multiplex) system for switching digital signals carried in timeslots on four incoming buses to timeslots on four outgoing buses, said network comprising:

first, second, third, fourth, fifth, sixth, seventh, and eighth storage means wherein (a) said first and second storage means are selectively responsive to signals appearing on said first and second incoming buses, (b) said third and fourth storage means are selectively responsive to signals appearing on said first and second incoming buses, (c) said fifth and sixth storage means are selectively responsive to signals appearing on said third and fourth incoming buses, and (d) said seventh and eighth storage means are selectively responsive to signals appearing on said third and fourth incoming buses;

said first outgoing bus is selectively responsive to signals stored in either said first and fifth storage means or said third and seventh storage means;

said second outgoing bus is selectively responsive to signals stored in either said third and seventh storage means or said first and fifth storage means;

said third outgoing bus is selectively responsive to signals stored in either said second and sixth storage means or said fourth and eighth storage means; and said fourth outgoing bus is selectively responsive to signals stored in either said fourth and eighth storage means or said second and sixth storage means.

20. The switching network of claim 19 wherein each said storage means has the capacity to store at least two full frames of data.

21. The switching network of claim 19 and 20 wherein a storage means is only responsive to one incoming bus per frame and wherein an outgoing bus is only responsive to one pair of storage means per frame.

22. The switching network of claim 19 wherein said first and second storage means are responsive to signals alternately from said first and second incoming buses and said third and fourth storage means are responsive to signals alternately from said first and second incoming buses such that said first and second storage means are not simultaneously responsive to the same incoming bus as are said third and fourth storage means; and wherein said fifth and sixth storage means are responsive to signals alternately from said third and fourth incoming buses and said seventh and eighth storage means are responsive to signals alternately from said third and fourth incoming buses such that said fifth and sixth storage means are not simultaneously responsive to the same incoming bus as are said seventh and eighth storage means.

23. The switching network of claim 22 wherein the alternating occurs at the rate of once per frame of data on the incoming buses.

24. A method for use in a TDM (time division multiplex) system for switching digital signals carried in timeslots on N incoming buses to timeslots on M outgoing buses, wherein N and M are positive integers, $N \geq 2$, and $M \geq 2$, said method comprising:

sequentially and cyclically storing the data from each incoming bus, of each group of n incoming buses, in n first storage groupings, each of N/n storage means, wherein n is a positive integer, $2 \leq n \leq N$, and n is a factor of N;

sequentially and cyclically connecting each outgoing bus, of each group of n outgoing buses, to storage means in one of M/n second groupings of said storage means, N/n storage means at a time, wherein each said second grouping of said storage means results from a re-organization of said first storage groupings and comprises one storage means from each of said first storage groupings, whereby each said second storage grouping comprises storage means responsive to different groups of n incoming buses, and whereby each outgoing bus has access to at least one storage means from each of said first groupings.

25. The method of claim 24 wherein N=M.

26. The method of claim 25 wherein N equals four and n equals two.

27. The method of claim 25 wherein N equals six and n equals two.

28. The method of claim 25 wherein N equals two and n equals two.

29. The method of claim 25 wherein N equals three and n equals three.

30. The method of claim 24, 25 or 26 wherein each said storage means has the capacity to store at least n full frames of data.

31. The switching network of claim 1, 2, or 4 wherein the rate at which things sequentially change is once every frame.

* * * * *